(12) United States Patent
Harada et al.

(10) Patent No.: US 7,749,458 B2
(45) Date of Patent: Jul. 6, 2010

(54) HONEYCOMB STRUCTURE

(75) Inventors: Takashi Harada, Nagoya (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 989 days.

(21) Appl. No.: 10/169,553

(22) PCT Filed: Jan. 11, 2001

(86) PCT No.: PCT/JP01/00076

§ 371 (c)(1),
(2), (4) Date: Jul. 8, 2002

(87) PCT Pub. No.: WO01/51173

PCT Pub. Date: Jul. 19, 2001

(65) Prior Publication Data

US 2002/0197193 A1 Dec. 26, 2002

(30) Foreign Application Priority Data

Jan. 13, 2000 (JP) ............................. 2000-005063

(51) Int. Cl.
*F01N 3/24* (2006.01)
*F01N 3/022* (2006.01)
*B01D 39/20* (2006.01)

(52) U.S. Cl. .................. 422/180; 422/222; 55/523; 55/DIG. 30

(58) Field of Classification Search ................ 422/171, 422/177, 180; 55/523, DIG. 30; 428/116
See application file for complete search history.

(56) References Cited

U.S. PATENT DOCUMENTS 2,337,691 A 12/1943 Stettinius et al.
4,233,351 A 11/1980 Okumura et al.

(Continued)

FOREIGN PATENT DOCUMENTS

EP 1 142 619 A1 10/2001

(Continued)

OTHER PUBLICATIONS

Schuetz, George. Quality Gaging Tips: Surface Texture from Ra to Rz. MMS Online(TM). http://www.mmsonline.com/articles/1102gage.html. No Date.*

(Continued)

*Primary Examiner*—Jennifer A Leung
(74) *Attorney, Agent, or Firm*—Burr & Brown

(57) ABSTRACT

This is directed to a honeycomb structure (10) including two or more honeycomb segments (11) having numerous through channels having been partitioned by walls and penetrating in axial direction thereof, the walls for through channels having a filtering function, and one end being clogged at predetermined through channels, and the other end at the remaining ones, and joint layers (12) for joining two or more honeycomb segments (11) each other. It may satisfy at least either that the Young's modulus of material of the joint layer (12) is 20% or less of that of the honeycomb segment (11), or that the material strength of joint layer (12) is lower than that of the honeycomb segment (11). This honeycomb structure shows a less thermal stress during use, has such a durability that no crack is formed, hardly shows a difference in temperature between the central portion and outer peripheral portion, and shows a lower pressure loss of fluid.

6 Claims, 3 Drawing Sheets

U.S. PATENT DOCUMENTS

| | | |
|---|---|---|
| 4,304,585 A | 12/1981 | Oda et al. |
| 4,598,054 A | 7/1986 | Mochida et al. |
| 5,545,243 A | 8/1996 | Kotani et al. |
| 5,552,102 A | 9/1996 | Kragle et al. |
| 5,629,067 A | 5/1997 | Kotani et al. |
| 5,914,187 A | 6/1999 | Naruse et al. ............... 428/116 |
| 6,669,751 B1 * | 12/2003 | Ohno et al. .................... 55/523 |
| 6,764,743 B2 | 7/2004 | Kato et al. |
| 6,797,666 B2 * | 9/2004 | Harada et al. ............... 502/180 |
| 7,112,233 B2 * | 9/2006 | Ohno et al. .................... 55/523 |
| 7,427,309 B2 * | 9/2008 | Ohno et al. .................... 55/523 |
| 2006/0292333 A1 * | 12/2006 | Ohno et al. ................. 428/116 |

FOREIGN PATENT DOCUMENTS

| | | |
|---|---|---|
| JP | 03121213 A * | 5/1991 |
| JP | 06-047620 A1 | 6/1994 |
| JP | 06-241017 | 8/1994 |
| JP | 07-054843 | 2/1995 |
| JP | 08-28246 A | 1/1996 |
| JP | 08-028248 | 1/1996 |
| JP | 9-158710 | 6/1997 |
| JP | 09-158710 A | 6/1997 |
| JP | 2000-279729 | 10/2000 |
| JP | 2000279729 A * | 10/2000 |

OTHER PUBLICATIONS

European Prosecution Letter dated Oct. 14, 2005.

Gulati, Suresh T., "*Strength and Thermal Shock Resistance of Segmented Wall-Flow Diesel Filters*," SAE Technical Paper Series No. 860008, Feb. 24-28, 1986, Detroit, Michigan.

* cited by examiner

FIG. 1 (a)
FIG. 1 (b)
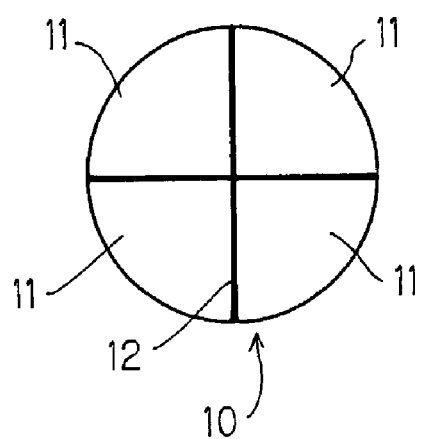
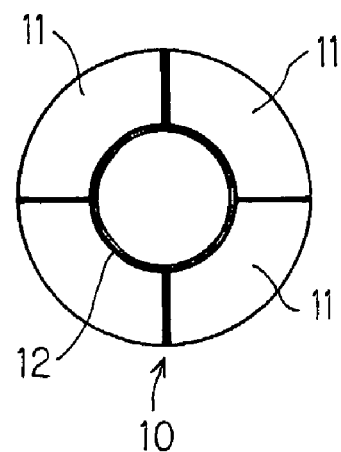
FIG. 1 (c)
FIG. 1 (d)
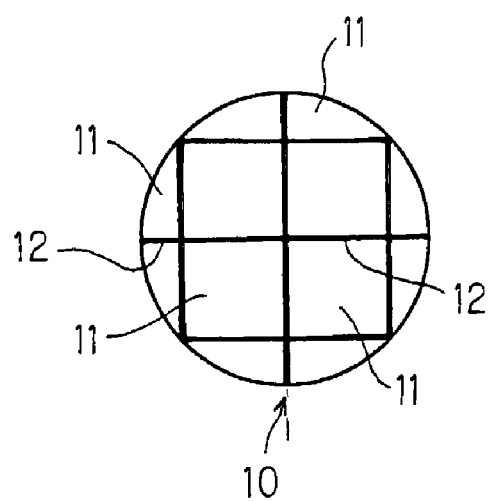
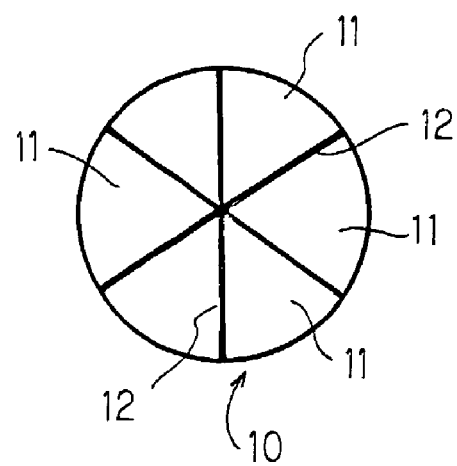

ONE CELL TO SEVERAL CELLS
40mm OR LONGER

FOUR-POINT BENDING TEST

HONEYCOMB STRUCTURE

TECHNICAL FIELD

The present invention relates to a honeycomb structure used as a filter which collects and removes particulate matters exhausted in a heat engine such as an internal combustion engine or combustion equipment such as a boiler.

BACKGROUND ART

Conventionally, as a method for collecting and removing particulate matters contained in a dust-containing fluid such as exhaust gas emitted from a diesel engine or the like, there is known the use of a honeycomb structure in which a wall of through channel has a filtering function, one end is clogged for predetermined through channels, and the other end is clogged for the remaining through channels.

In the case where such a honeycomb structure is used as a filter for collecting particulate matters in exhaust gas, it is necessary to perform regenerating treatment in which accumulating carbon particulates are burned and removed. At this time, a local increase in temperature is unavoidable, so that a high thermal stress is liable to occur, which poses a problem in that a crack is liable to develop.

As measures for reducing the thermal stress occurring in such a structural part, a method in which the structural part is divided into small segments is known. The use of a honeycomb structure for collecting particulates in exhaust gas has already been proposed in JP-A-6-241017, JP-A-8-28246, JP-A-7-54643, JP-A-8-28248, etc.

However, even in the examples proposed in the aforementioned patent publications, the effect of reducing stress on segment surface is insufficient, and the problem of crack development cannot be solved completely. Also, there is a problem in that a shift in axial direction occurs between the segments during the use. Although a method in which a holding member is used to prevent the shift in the axial direction has been proposed in JP-A-6-241017, there is a problem of deformation and deterioration of the holding member occurring when the member is subject to high temperatures of exhaust gas.

As other measures for reducing thermal stress, there has been proposed a method in which a portion liable to have a relatively low temperature is heated electrically by providing an electric heater between the segments to make the temperature distribution in honeycomb structure uniform. However, this method has a problem of the occurrence of a new thermal stress because a local temperature gradient rather increases in the vicinity of the electric heater.

Also, there are a problem in that the ratio of the joint layer between the segments to the cross section is too high, so that the pressure loss of fluid is excessive, which deteriorates the engine performance, and a problem in that the heat capacity is too high, so that the rise in temperature takes much time in the regenerating treatment in which carbon particulates are burned to be removed, which prolongs the time necessary for regenerating treatment.

The present invention has been made to solve the above problems, and accordingly an object thereof is to provide a honeycomb structure in which a less thermal stress occurs during the use; durability such that no crack develops is ensured; a difference in temperature between the central portion and the outer peripheral portion is less liable to be produced; the pressure loss of fluid is low; and the time and energy necessary for the rise in temperature at the time of regenerating treatment are less.

DISCLOSURE OF THE INVENTION

According to the present invention, there is provided a honeycomb structure including two or more honeycomb segments each of which has a large number of through channels which are partitioned by walls and penetrate in the axial direction, the wall of the through channel having a filtering function, and is constructed so that one end is clogged for predetermined through channels, and the other end is clogged for the remaining through channels, and a joint layer for joining the two or more honeycomb segments to each other, characterized in that at least either that the Young's modulus of material of the joint layer is 20% or less of the Young's modulus of material of the honeycomb segment, or that the material strength of the joint layer is lower than the material strength of the honeycomb segment is satisfied.

In the present invention, a portion having an area of at least 30% of the surface area of the honeycomb segment in contact with the joint layer preferably has average surface roughness Ra exceeding 0.4 micron, and the ratio of the total heat capacity of all the joint layers in the honeycomb structure to the total heat capacity of all the honeycomb segments constituting the honeycomb structure is preferably 30% or lower.

Further, in the honeycomb structure in accordance with the present invention, it is preferable that a corner portion of a cross-sectional shape of the honeycomb segment in the cross section perpendicular to the through channel of the honeycomb structure be rounded with a radius of curvature of 0.3 mm or larger, or be chamfered 0.5 mm or more.

Also, the ratio of the total cross-sectional area of the joint layers to the cross-sectional area of the honeycomb structure in the cross section perpendicular to the through channel of the honeycomb structure is preferably 17% or lower, and further the ratio of the sum of the cross-sectional areas of the joint layers to the sum of the cross-sectional areas of the walls in the cross section of honeycomb structure perpendicular to the through channel of the honeycomb structure is preferably 50% or lower. Sill further, it is preferable that the ratio of the cross-sectional area of joint layer to the cross-sectional area of wall in the cross section of honeycomb structure perpendicular to the through channel of the honeycomb structure be higher in the central portion and be lower on the outer peripheral side.

As a material of the honeycomb segment, one kind of material selected from a group consisting of cordierite, SiC, SiN, alumina, mullite, and lithium aluminum silicate (LAS) is preferably used as a main crystal phase from the viewpoint of strength, heat resistance, and the like.

Also, it is preferable that the honeycomb segment carry a metal having a catalytic function so as to be used to purify exhaust gas from a heat engine or combustion equipment or to reform a liquid fuel or a gas fuel. As the metal having a catalytic function, at least one kind of Pt, Pd, and Rh is preferably used.

Further, the cross-sectional shape of the through channel in the honeycomb structure is preferably any of triangle, quadrangle, and hexagon.

BRIEF DESCRIPTION OF THE DRAWINGS

FIGS. 1(a), 1(b), 1(c) and 1(d) are explanatory views showing various division patterns of honeycomb segment of a honeycomb structure in accordance with the present invention.

BEST MODE FOR CARRYING OUT THE INVENTION

Figure 2:
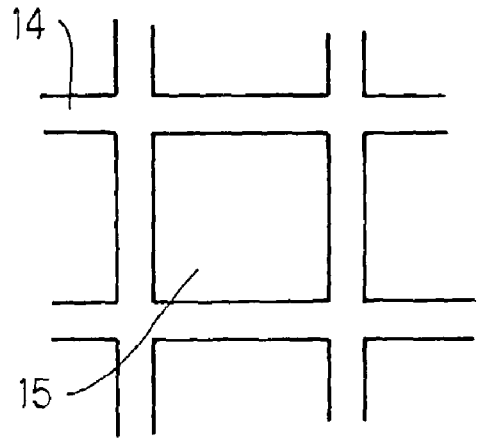
FIG. 2 is a partially enlarged view showing a cell construction of a honeycomb structure.

The present invention will now be described in further detail with reference to an embodiment shown in the accompanying drawings. The present invention is not limited to this embodiment.

FIGS. 1(a), 1(b), 1(c) and 1(d) are explanatory views showing various division patterns of honeycomb segment of a honeycomb structure in accordance with the present invention.

In FIGS. 1(a), 1(b), 1(c) and 1(d), reference numeral 10 denotes a honeycomb structure. The honeycomb structure 10 is made up of two or more honeycomb segments 11 and joint layers 12 for joining these honeycomb segments 11. Though not shown in detail, the honeycomb segment 11 has a large number of through channels 15 which are partitioned by walls 14 and penetrate in the axial direction. The wall 14 of the through channel 15 has a filtering function, and the construction is such that one end is clogged for predetermined through channels 15, and the other end is clogged for the remaining through channels 15.

In the honeycomb structure in accordance with the present invention, the Young's modulus of a material forming the joint layer 12 is made preferably 20% or less more preferably 1% or less of the Young's modulus of a material forming the honeycomb segment 11, or the material strength of the joint layer 12 is made lower than the material strength of the honeycomb segment 11. By specifying the Young's moduli of materials of the joint layer 12 and the honeycomb segment 11, a honeycomb structure in which a less thermal stress occurs during the use, and durability such that no crack develops is ensured can be provided. Also, even in the case where the Young's modulus of the joint layer 12 exceeds 20% of the Young's modulus of the honeycomb segment 11, if the material strength of the joint layer 12 is lower than the material strength of the honeycomb segment 11, a crack develops only in the joint layer 12, and the honeycomb segment 11 is not damaged, so that the honeycomb structure maintains a sufficient function.

Herein, the Young's modulus of the joint layer 12 and the Young's modulus of the honeycomb segment 11 means the Young's modulus of each material itself thereof, that is, the physical property inherent in the material.

Also, the definition of "the material strength of the joint layer is lower than the material strength of the honeycomb segment" will be explained below with reference to FIGS. 5 and 6.

Figure 5:
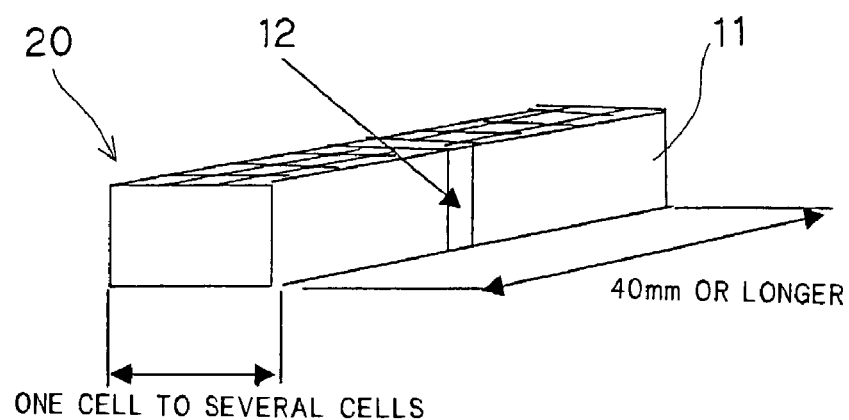
FIG. 5 is a perspective view showing one example of a test piece cut out of a honeycomb structure.
Figure 6:
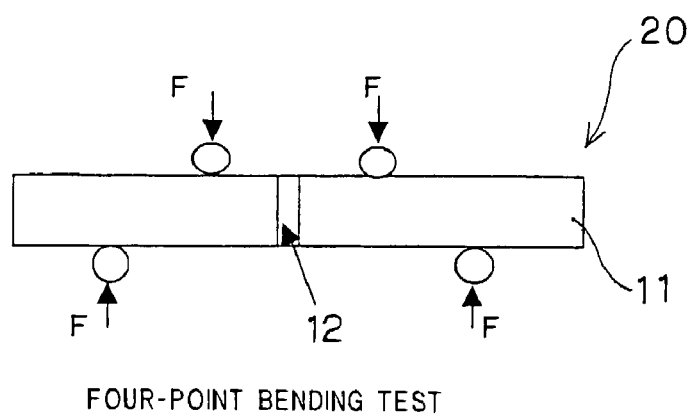
FIG. 6 is an explanatory view showing an example of a four-point bending test.

A test piece 20 cut out of the honeycomb structure in accordance with the present invention as shown in FIG. 5 is prepared. The test piece 20 is cut so that the length in the direction perpendicular to the through channel is 40 mm or larger and the joint layer 12 is located in the center thereof. In the present invention, the fact that in a four-point bending test (in conformity to JIS R1601) as shown in FIG. 6 of the test piece 20, the probability that a fracture occurs within the joint layer 12 or at the interface between the joint layer 12 and the honeycomb segment 11 is 50% or higher is defined as the aforementioned "the material strength of the joint layer is lower than the material strength of the honeycomb segment".

Also, it is preferable that in this honeycomb structure, a portion having an area of at least 30% of the surface area of the honeycomb segment 11 in contact with the joint layer 12 have average surface roughness Ra exceeding 0.4 micron. Thereby, the two or more honeycomb segments 11 are joined more firmly, and a fear of peeling off at the time of use can almost be dispelled. The aforementioned surface roughness Ra is further preferably be 0.8 microns or more.

Also, the ratio of the total heat capacity of all the joint layers in the honeycomb structure to the total heat capacity of all the honeycomb segments constituting the honeycomb structure is preferably made 30% or lower, more preferably 15% or lower. Thereby, when the carbon particulates collected at the time of regeneration are burned to be disposed of (filter regeneration), the time taken for the rise in temperature can desirably be kept in the allowable range.

Further, it is preferable that in the honeycomb structure in accordance with the present invention, a corner portion of a cross-sectional shape of honeycomb segment in the cross section perpendicular to the through channel of honeycomb structure be rounded with a radius of curvature of 0.3 mm or larger, or be chamfered 0.5 mm or more because the occurrence of thermal stress at the time of use is reduced and great durability such that no crack develops can be given to the honeycomb structure.

Figure 3:
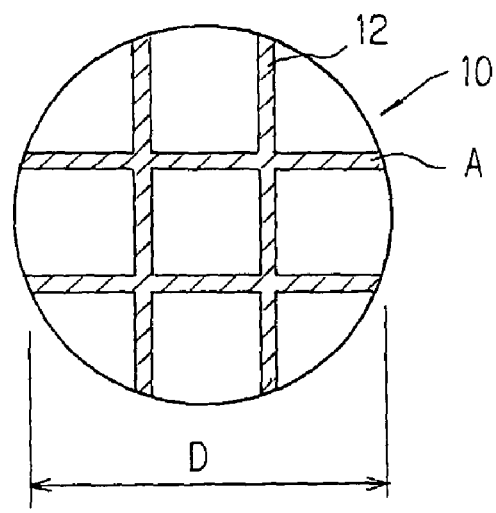
FIG. 3 is a sectional view for illustrating one example of a honeycomb structure.

Still further, in the present invention, it is preferable that the ratio of the total cross-sectional area of the joint layers to the cross-sectional area of the honeycomb structure in the cross section perpendicular to the through channel of honeycomb structure be 17% or lower, more preferably 8% or lower. The explanation of this is given with reference to FIG. 3. Referring to FIG. 3, in the circular honeycomb structure 10 having a cross section with diameter D, the total cross-sectional area $S_H$ of the honeycomb structure 10 is expressed by the following formula.

$$S_H = (\pi/4) \times D^2$$

On the other hand, the total cross-sectional area $S_s$ of the joint layers 12 is the total area of hatched portion A in FIG. 3 (cross-sectional portion of the joint layers 12).

Herein, the ratio of $S_S/S_H$ should preferably be 17% or lower from the viewpoint of the decrease in pressure loss of fluid.

Figure 4:
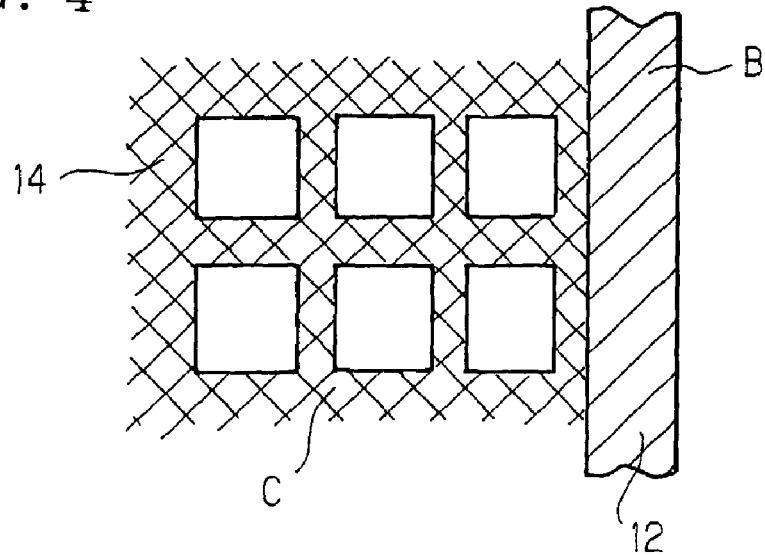
FIG. 4 is a partially enlarged view showing a cell construction and a joint layer of a honeycomb structure.

Also, in the present invention, it is preferable that the ratio of the sum of the cross-sectional areas of joint layers to the sum of the cross-sectional areas of walls in the cross section of honeycomb structure perpendicular to the through channel of honeycomb structure be 50% or lower, more preferably 24% or lower. Referring to FIG. 4, taking the sum of the cross-sectional areas (hatched portion B) of the joint layers 12 in the cross section of the honeycomb structure 10 as $S_s$, and taking the sum of the cross-sectional areas (meshed portion C) of the walls 14 as $S_c$, the ratio of $S_s/S_c$ should preferably be 50% or lower from the viewpoint of the decrease in pressure loss of fluid.

Further, in the present invention, it is preferable that the ratio of the cross-sectional area of joint layer to the cross-sectional area of wall in the cross section of honeycomb structure perpendicular to the through channel of honeycomb structure be higher in the central portion and be lower on the outer peripheral side. According to such configuration, the quantity of collected carbon particulates per unit volume is smaller in the vicinity of the center than in the vicinity of the outer periphery, so that at the time of regenerating treatment at which carbon particulates are burned (regenerative combustion time), the calorific value in the vicinity of the center, where high temperatures are liable to be generated, can be kept low. Moreover, the joint layer in the vicinity of the center is dense, so that the heat capacity in that portion can be increased. For these reasons, the increase in temperature in the vicinity of the center can be kept low. As a result, a difference in temperature between the central portion and the outer peripheral side can be decreased, so that the thermal stress in the honeycomb structure can desirably be decreased.

In the present invention, the cross section perpendicular to the through channel of honeycomb structure can take various shapes such as circle, ellipse, and racetrack.

Also, the honeycomb segment constituting the honeycomb structure in accordance with the present invention preferably has a main crystal phase of one kind selected from a group consisting of cordierite, SiC, SiN, alumina, mullite, and lithium aluminum silicate (LAS) from the viewpoint of strength, heat resistance, and the like. Silicon carbide (SiC), which has a high coefficient of thermal conductivity, is especially preferable because heat can be dissipated easily.

The cell density of honeycomb segment is preferably 6 to 1500 cells/in$^2$ (0.9 to 233 cells/cm$^2$), further preferably 50 to 400 cells/in$^2$ (7.8 to 62 cells/cm$^2$). If the cell density is lower than 6 cells/in$^2$, the strength and effective GSA (Geometrical Surface Area) are insufficient as the honeycomb segment. If the cell density is higher than 1500 cells/in$^2$, the pressure loss increases when gas flows.

Also, the cross-sectional shape of through channel (cell shape) in the honeycomb structure is preferably any of triangle, quadrangle, and hexagon from the viewpoint of manufacture.

Also, as a material of joint layer that joins the honeycomb segment to each other, ceramic fiber, ceramic powder, cement, or the like, which has heat resistance, are preferably used singly or by being mixed. Further, as necessary, an organic binder, an inorganic binder, etc. may be used by being mixed. The material of joint layer is not limited to the above-described materials.

The honeycomb structure in accordance with the present invention has a construction such that, as described above, it has a large number of through channels which are partitioned by walls and penetrate in the axial direction; the wall of the through channel has a filtering function; and one end is clogged for predetermined through channels, and the other end is clogged for the remaining through channels. Therefore, the honeycomb structure can be suitably used as a filter which collects and removes particulate matters contained in a dust-containing fluid, such as a particulate filter for a diesel engine.

Specifically, if a dust-containing fluid is caused to pass through one end face of the honeycomb structure having such a construction, the dust-containing fluid enters a through channel in the honeycomb structure whose end on the one end face side is not clogged, and passes through the porous wall having a filtering function to enter another through channel in the honeycomb structure whose end on the other end face side is not clogged. When passing through the wall, particulate matters in the dust-containing fluid are collected to the wall, and the purified fluid from which particulate matters have been removed is discharged from the other end face of honeycomb structure.

If the collected particulate matters accumulate on the wall, the wall is clogged, so that the function as a filter decreases. Therefore, the honeycomb structure is heated periodically by heating means such as a heater to burn and remove the particulate matters, by which the filtering function is regenerated. To accelerate the combustion of particulate matters at the time of regeneration, a metal having a catalytic function, as described later, may be carried on the honeycomb segment.

On the other hand, in the case where the honeycomb structure in accordance with the present invention is used to purify exhaust gas from a heat engine such as an internal combustion engine or to reform a liquid fuel or a gas fuel as a catalyst carrier, a metal having a catalytic function is carried on the honeycomb segment. As a typical metal having a catalytic function, Pt, Pd, and Rh are cited. At least one kind of these metals is preferably carried on the honeycomb segment.

Hereunder, the present invention will be described in further detail with reference to examples. The present invention is not limited to these examples.

EXAMPLES 1 to 10, COMPARATIVE EXAMPLE 1

Honeycomb structures measuring 144 mm in diameter and 153 mm in length having various division constructions were manufactured using a SiC-made honeycomb segment having a wall thickness of 0.38 mm, a cell density of 200 cells/in$^2$ (31 cells/cm$^2$), and a thickness of outer peripheral portion of 0.5 mm, and using a mixture of ceramic fiber, ceramic powder, and organic and inorganic binders as the joint layer. The division construction and the properties such as the Young's modulus of material of the obtained honeycomb structure are given in Table 1. Also, the surface roughness given in Table 1 indicates the average surface roughness of the whole surface of honeycomb segment in contact with the joint layer.

This honeycomb structure is a particulate filter for purifying exhaust gas from a diesel engine, which has a construction such that one end is clogged for predetermined through channels, and the other end is clogged for the remaining through channels. The fluid pressure loss test and the regeneration test were conducted on these honeycomb structures. The results are given in Table 1.

TABLE 1

|  | Example 1 | Example 2 | Example 3 | Example 4 | Example 5 | Example 6 |
|---|---|---|---|---|---|---|
| Division construction | (a) | (b) | (b) | (b) | (c) | (c) |
| Young's modulus of wall material (Gpa) | 42 | 42 | 42 | 42 | 42 | 42 |
| Young's modulus of joint layer material (Gpa) | 0.4 | 4 | 4 | 4 | 8 | 8 |
| Young's modulus of joint layer/Young's modulus of wall (%) | 1 | 10 | 10 | 10 | 19 | 19 |
| Segment corner | R0.3 | Acute angle | R0.3 | R0.3 | R0.3 | R0.3 |

TABLE 1-continued

|  |  |  |  |  |  |  |  |
|---|---|---|---|---|---|---|---|
| Result of regeneration test (segment crack) | Quantity of soot: Large | Absent | Present | Present | Present | Present | Present |
|  | Quantity of soot: Standard | Absent | Present | Absent | Absent | Absent | Absent |
| Segment surface roughness (Ra μm) | | 0.8 | 0.8 | 0.3 | 0.3 | 0.8 | 0.8 |
| Axial shift after test | | Absent | Absent | Present | Present | Absent | Absent |
| Wall thickness (mm) | | 0.38 | 0.38 | 0.38 | 0.38 | 0.38 | 0.38 |
| Joint layer thickness (mm) | | 2 | 2 | 2 | 2 | 4 | 2 |
| Joint layer area/structure area (%) | | 3.5 | 4.4 | 4.4 | 4.4 | 17 | 8.5 |
| Joint layer area/wall area (%) | | 9.7 | 12.2 | 12.2 | 12.2 | 50 | 24.5 |
| Result of fluid pressure loss test | | Allowable range | Allowable range | Allowable range | Allowable range | Allowable range | Allowable range |
| Regeneration time | | Allowable range | Allowable range | Allowable range | Allowable range | Allowable range | Allowable range |
| Heat capacity ratio (%) | | 6 | 7 | 7 | 7 | 30 | 15 |
| Joint layer strength (with respect to segment strength) | | High | High | High | High | High | High |

|  |  | Example 7 | Example 8 | Example 9 | Example 10 | Comparative example 1 |
|---|---|---|---|---|---|---|
| Division construction | | (c) | (d) | (c) | (c) | Integrated product |
| Young's modulus of wall material (Gpa) | | 42 | 42 | 42 | 42 | 42 |
| Young's modulus of joint layer material (Gpa) | | 8 | 4 | 30 | 30 | — |
| Young's modulus of joint layer/Young's modulus of wall (%) | | 19 | 10 | 71 | 71 | — |
| Segment corner | | R0.3 | R0.3 | R0.3 | R0.3 | — |
| Result of regeneration test (segment crack) | Quantity of soot: Large | Present | Present | Absent | Absent | Present |
|  | Quantity of soot: Standard | Absent | Absent | Absent | Absent | Present |
| Segment surface roughness (Ra μm) | | 0.8 | 0.8 | 0.8 | 0.8 | — |
| Axial shift after test | | Absent | Absent | Absent | Absent | — |
| Wall thickness (mm) | | 0.38 | 0.38 | 0.38 | 0.38 | 0.38 |
| Joint layer thickness (mm) | | 5 | 2 | 1 | 2 | 2 |
| Joint layer area/structure area (%) | | 21 | 5.3 | 4.3 | 8.5 | — |
| Joint layer area/wall area (%) | | 70.5 | 14.7 | 12.3 | 24.5 | — |
| Result of fluid pressure loss test | | High | Allowable range | Allowable range | Allowable range | Allowable range |
| Regeneration time | | Long | Allowable range | Allowable range | Allowable range | Allowable range |
| Heat capacity ratio (%) | | 42 | 9 | 8 | 15 | — |
| Joint layer strength (with respect to segment strength) | | High | High | Low | Low | — |

[Evaluation]

As is apparent from the results given in Table 1, when the requirements specified in the present invention were satisfied, the pressure loss of fluid was not so high, being within the allowable range (10 kPa), and the regeneration time was within the allowable range (15 min).

Industrial Applicability

As described above, the honeycomb structure in accordance with the present invention achieves a remarkable effect that a less thermal stress occurs during the use; durability such that no crack develops is ensured; a difference in temperature between the central portion and the outer peripheral portion hardly occurs; and moreover the pressure loss of fluid is low.

The invention claimed is:

1. A honeycomb structure comprising:
   two or more honeycomb segments, each having a large number of through channels that are partitioned by walls and penetrate in axial directions, said walls of said through channels having a filtering function, said structure being constructed so that one end is clogged for predetermined through channels, and the other end is clogged for the remaining through channels, wherein a corner portion of a cross-sectional shape of at least one of said honeycomb segments in a cross-section perpendicular to said through channels of said honeycomb structure has a rounded shape with a radius of curvature of 0.3 mm or larger; and
   one or more joint layers joining said two or more honeycomb segments to each other;
   wherein a ratio of a cross-sectional area of the joint layers to a cross-sectional area of the walls in a cross-section of the honeycomb structure perpendicular to the through channels of the honeycomb structure is higher in a central portion of the honeycomb structure than in an outer peripheral portion of the honeycomb structure;
   wherein said honeycomb segments and said joint layers comprise materials wherein a material strength of said joint layers is lower than a material strength of said honeycomb segments;

wherein a portion having an area of at least 30% of the surface area of said honeycomb segment in contact with said joint layer has an average surface roughness Ra exceeding 0.4 micron;

wherein a ratio of a total heat capacity of all said joint layers in said honeycomb structure to a total heat capacity of all said honeycomb segments constituting said honeycomb structure is 30% or lower;

wherein a ratio of a sum of the cross-sectional areas of said joint layers to a sum of the cross-sectional areas of said walls in a cross-section of said honeycomb structure perpendicular to said through channels of said honeycomb structure is 50% or lower; and wherein a ratio of a total cross-sectional area of said joint layers to a cross-sectional area of said honeycomb structure in a cross-section perpendicular to said through channels of said honeycomb structure is 17% or lower.

2. The honeycomb structure according to claim 1, wherein the material of said honeycomb segment has a main crystal phase of one kind selected from the group consisting of cordierite, SiC, SiN, alumina, mullite, and lithium aluminum silicate (LAS).

3. The honeycomb structure according to claim 1, wherein said honeycomb segment carries a metal having a catalytic function to purify exhaust gas from a heat engine or combustion equipment or to reform a liquid fuel or a gas fuel.

4. The honeycomb structure according to claim 3, wherein said metal having a catalytic function is at least one of Pt, Pd, and Rh.

5. The honeycomb structure according to claim 1, wherein a cross-sectional shape of said through channels in said honeycomb segment is one of a triangle, a quadrangle, and a hexagon.

6. The honeycomb structure according to claim 1, wherein said honeycomb structure is adapted to be heated periodically by heating means to burn and remove particulate matters such that less thermal stress occurs and crack development is minimized.

* * * * *